FILTER CIRCUIT
Filed April 28, 1964
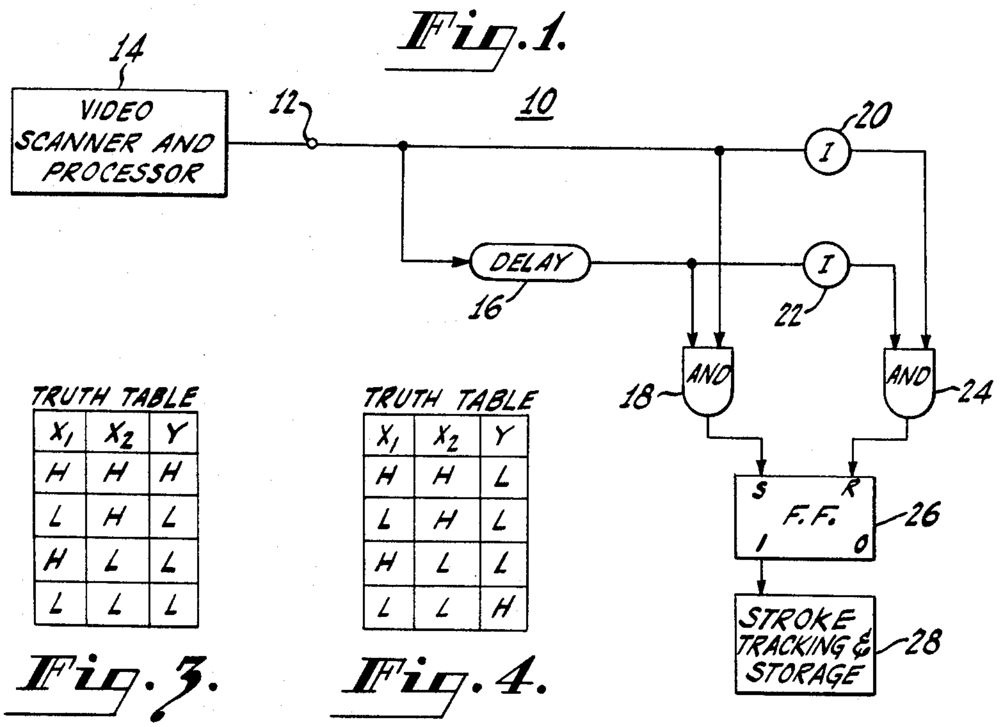
Fig. 1.
TRUTH TABLE
| $X_1$ | $X_2$ | Y |
|---|---|---|
| H | H | H |
| L | H | L |
| H | L | L |
| L | L | L |
Fig. 3.
TRUTH TABLE
| $X_1$ | $X_2$ | Y |
|---|---|---|
| H | H | L |
| L | H | L |
| H | L | L |
| L | L | H |
Fig. 4.
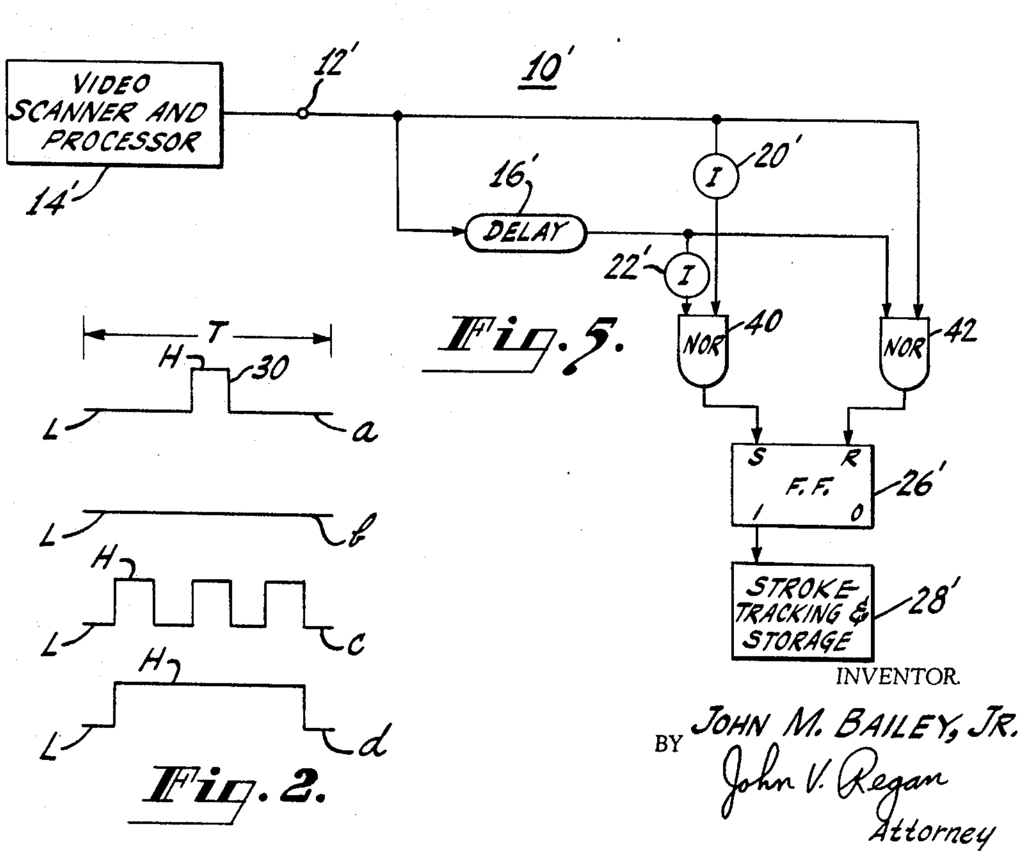
Fig. 5, Fig. 2.
INVENTOR.
JOHN M. BAILEY, JR.
BY John V. Regan
Attorney

United States Patent Office 3,394,346

Patented July 23, 1968

3,394,346

FILTER CIRCUIT

John M. Bailey, Jr., Barrington, N.J., assignor to Radio Corporation of America, a corporation of Delaware Filed Apr. 28, 1964, Ser. No. 363,226

1 Claim. (Cl. 340—146.3)

This invention relates to filter circuits, and more particularly to logic filter circuits for use in optical character reading systems.

Certain optical character readers operate to scan characters printed on a document and recognize the characters by the distinctive sets of video signals produced when different characters are scanned. One such reader is disclosed in a copending appplication for J. M. Bailey, Jr., et al. entitled, "Character Reader," filed May 13, 1963, Ser. No. 279,842, now Patent No. 3,290,650 and assigned to the same assignee as the present invention. Each character is scanned by a plurality of successive scanlines and each scan produces a video signal pulse each time the outline trace of a character is intercepted. A video signal pulse in any one scan corresponds to one of the strokes into which the outline trace of a character may be divided. Once detected, each stroke is separately tracked from scan to scan throughout the remaining scans of the character to derive stroke information signals which aid in differentiating one character from another. In such character readers, it is important that undesired video pulses produced, for example, by dirt marks or the like on a document, be filtered out from the desired video signals so that the character reader does not interpret a dirt mark as a stroke. If such interpretations are made, incorrect recognitions occur. Furthermore, the characters from many printing fonts contain serifs which may also be incorrectly interpreted as strokes.

Accordingly, it is an object of this invention to provide a new and improved noise filter for use in optical character readers.

It is another object of this invention to provide a new and improved logic circuit filter which removes undesired noise pulses from video signals in an optical character reader.

It is a further object of this invention to provide a logic filter for a character reader which permits the character reader to read some character fonts containing serifs.

It is still another object of this invention to provide a logic filter which effectively fills in voids in printed characters.

A logic circuit filter in accordance with the invention compares adjacent pairs of scans to determine if a video pulse detected in one scan also occurs at a corresponding time in the next scan. If video pulses do occur in both scans, the pulses are passed by the filter circuit, whereas if they occur only in one scan, they are blocked. Thus, the circuit determines if information detected in one scan has a logical continuation in the following scan. If the information does not, it is blocked.

In one embodiment of the invention, the logic circuit filter utilizes a delay circuit coupled to the scanner in the optical character reader to introduce a delay of one scan period into each scanline of video signals. Both the delayed video signals and the directly generated video signals are applied to a first coincidence gate. Inverted delayed video signals and inverted generated video signals are also applied to a second coincidence gate. The first and second coincidence gates operate to compare the video information in the two successive lines. The gate outputs are coupled to a flip-flop so that the coincidence of video pulses in two successive scans sets the flip-flop to produce an output signal whereas the absence of video signals from two successive scans resets the flip-flop to block the output signal. The filter therefore blocks noise pulses not contained in two successive scans of the video signals.

In the drawing:

FIGURE 1 is a schematic block diagram of a logical noise filter in accordance with the invention;

FIGURE 2 is a graphical representation of video signals derived in scanning a character and helpful in explaining the invention;

FIGURES 3 and 4 are Truth Tables of logic gates which may be utilized in practicing the invention; and, FIGURE 5 is a schematic block diagram of another embodiment of the invention.

Referring now to FIGURE 1, a logic circuit filter 10 includes an input terminal 12 which is coupled to receive video signals derived from a video scanner and processing circuit 14. The video signals derived from the processor 14 may, for example, be similar to those shown in lines "*a*" through "*d*" of FIGURE 2. Lines "*a*" through "*d*" represent four typical, idealized scanlines of quantized video signals derived from scanning a document. Each scanline is of a duration T, which represents the period of the scans. The scanlines "*a*" through "*d*" depart from a low or white level L whenever black dirt marks or the black outline of a character is intercepted when scanning a white document. These pulses are quantized in the processor 14 to provide pulses of a uniform black or high level H.

Referring back to FIGURE 1, a delay circuit 16, exhibiting a delay equal to the period T of one scanline, is coupled from the input terminal 12 of the filter 10 to apply a delayed video signal as one input to a first coincidence gate 18. The other input to the first coincidence gate 18 is derived directly from the input terminal 12 of the filter 10 and comprises a direct or generated video signal. Both the direct and the delayed video signals are also applied, respectively, through a pair of inverters 20 and 22 to the input terminals of a second coincidence gate 24.

The coincidence gates 26 and 32 may, for example, comprise AND gates and are shown as such. The AND gates 18 and 24 each exhibit a Truth Table as shown in FIGURE 3, wherein $X_1$ and $X_2$ are the input signals and Y is the output signal of the gates. It is apparent from FIGURE 3 that the gates 18 and 24 produce an output signal of a high level H only when both of the input signals thereto are high H.

The outputs of the coincidence gates 18 and 24 are applied to the set (S) and reset (R) terminals, respectively, of a bistable flip-flop 26. When the flip-flop 26 is set, an output signal of one level is derived from the "1" output terminal thereof and is applied to the stroke tracking and storage circuits 28 in the character reader. When the flip-flop 26 is reset, an output signal of another level is derived from the "1" output terminal thereof.

In operation, the logical noise filter 10 removes noise pulses in video signals derived from scanning characters printed on a document. If a pair of successive scans produce video signals such as that shown in lines *a* and *b* in FIGURE 2, the noise pulse 30 in line *a* will be removed from the video signal by the filter 10. The signals in the scanlines *a* and *b* will appear coincidentally at the inputs to the AND gates 18 and 24 due to the one scan delay introduced into the scanline *a* by the delay circuit 16. Initially, both signals exhibit a white level L which is inverted in the inverters 20 and 22 to produce a pair of black level H signals at the inputs to the AND gate 24. The flip-flop 26 is therefore reset. The pulse 30 in the delayed scanline *a* does not activate the gate 18 since a coincidental pulse is absent from the scanline *b*. The flip-flop 26 is therefore not set during this scan and consequently the noise pulse 30 is not transmitted to the stroke tracking and storage circuits 28.

Some imperfectly formed characters will effectively be filled in by the filter 10. In FIGURE 2, the scanlines *c* and *d* may result from the first two scans when scanning a character having an imperfectly printed leading edge. Thus, in the scan *c* the imperfectly formed leading edge of the character causes three pulses to appear in this scan. However, the scanline *d* shows that the character, in fact, exihibits a long stroke by the occurrence of a long black pulse in the scanline. The noise filter 10 fills in the void spaces and prevents the stroke information circuits 28 from attempting to track three different strokes of the character when only one actually occurs. Thus, the coincidence of the black levels H in the scans *c* and *d* generates an output from the coincidence gate 18 to set the flip-flop 26. The deactivation of the coincidence gate 18 when the video signal in line *c* drops to the white level L does not affect the flip-flop 28. The flip-flop 28 is not reset until the video signals in both scanlines *c* and *d* drop to the white level L. The output signal from the flip-flop 26 is therefore substantially identical to the video signal in line *d* of FIGURE 2 and, consequently, an imperfectly printed character is filled in by the filter 10.

It is also to be noted that characters from some fonts containing serifs, such as an "I," will have both the leading and trailing edges of the character filled in by the filter 10. Thus, such characters are read by a character reader incorporating the invention without incorrect stroke interpretations occurring.

Referring now to FIGURE 5, there is illustrated another embodiment of the invention wherein coincidence gates 40 and 42 of the NOR type are substituted for the AND gates 18 and 24 of FIGURE 1. In FIGURE 5 components identical to those in FIGURE 1 are given the same reference numerals but these numerals are primed. The NOR gates 40 and 42 exhibit a Truth Table as shown in FIGURE 4 and produce a high output signal H only when two low level input signals L are applied thereto. Consequently, in this embodiment of the invention, the inverters 20' and 22' are coupled to invert black level signals H so that the NOR gate 40 is activated on black level signals to set the flip-flop 26'. The NOR gate 42 resets the flip-flop 26' upon simultaneous white level signals L occurring in two scans. The operation of the embodiment of the invention shown in FIGURE 5 is otherwise similar to the operation of that shown in FIGURE 1.

Thus, a logical noise filter for a character reader is provided. The noise signal compares video signals in adjacent pairs of scans to filter out noise signal pulses that occur.

What is claimed is:

1. In a system for reading characters, the combination comprising:

a scanner for scanning said characters by a plurality of successive scanlines of a predetermined period to generate video signals that include video pulses corresponding to said characters and undesired noise signals, and a filter coupled to said scanner for suppressing said undesired noise signals and passing said video signal pulses, said filter including, a delay circuit exhibting a time delay of one of said predetermined periods coupled to said scanner to delay each scanline of video signals for one scan time, a first coincidence circuit having one input terminal coupled to said scanner and another input terminal coupled to said delay circuit to generate a first signal upon the simultaneous coincidence of video signal pulses in both a delayed scan and a generated scan, a second coincidence circuit having one input terminal coupled to said scanner and another input terminal coupled to said delay circuit to generate a second signal whenever video signal pulses are simultaneously absent from both a delayed scan and a generated scan, and a bistable flip-flop coupled to said first and second coincidence circuits to produce an output signal, that includes said video signal pulses, upon the occurrence of said first signal and to turn off said output signal to suppress said noise signals upon the occurrence of said second signal.

References Cited

UNITED STATES PATENTS

| | | | |
|---|---|---|---|
| 2,963,683 | 12/1960 | Demer et al. | 340—146.3 |
| 3,184,542 | 5/1965 | Horsley | 178—6 |
| 3,290,650 | 12/1966 | Bailey et al. | 340—146.3 |

MAYNARD R. WILBUR, *Primary Examiner.*

J. SHERIDAN, *Assistant Examiner.*